July 3, 1962 G. A. RICHTER 3,041,781
LAWN EDGING DEVICE
Filed July 22, 1960

INVENTOR.
GEORGE A. RICHTER
BY
Miketta and Glenny
ATTORNEYS.

United States Patent Office 3,041,781
Patented July 3, 1962

3,041,781
LAWN EDGING DEVICE
George A. Richter, 2842 N. Pershing Ave.,
San Bernardino, Calif.
Filed July 22, 1960, Ser. No. 44,751
1 Claim. (Cl. 47—33)

The present invention relates to a device for forming edges or borders around lawns, yards or the like.

One of the most time-consuming and burdensome jobs in cutting the grass of a lawn, is the trimming operation. It is extremely difficult if not impossible for a lawn mower to satisfactorily cut the grass adjacent to sidewalks, buildings, houses, flower beds, trees, bushes or the like. The wheels of the lawn mower crush the grass adjacent to these objects and therefore prevent the grass around these objects from being cut. Therefore, the edges of the lawn are required to be trimmed, either by hand or machine.

It is known that heretofore devices have been used for forming edges around a yard or lawn. These devices included a horizontal edging strip which was adapted to serve as a runway for the wheels of a lawn mower. However, it has been found that the grass adjacent to these lawn edging devices was not being cut by the lawn mower and therefore had to be trimmed. This was caused by the elevation of one wheel of the lawn mower riding on the horizontal strip of these lawn edging devices while the other wheel of the lawn mower was traveling on the grass or in a plane below the level of the lawn edging device. Consequently, these devices were not satisfactorily performing one of their most important functions, the elimination of trimming the edges of a lawn after it has been cut.

Accordingly, it is a general object of the present invention to provide a device for forming an edge or border for a lawn that avoids all of the foregoing disadvantages of similar type devices used heretofore.

An object of the present invention is to provide a lawn edging device which is decorative, forms an edge for a lawn, is inexpensive to manufacture and which can be quickly and easily installed.

Another object is to provide a device for forming an edge or border for a lawn which is decorative and eliminates the necessity of trimming (either by hand or machine) the edges of the lawn.

Other objects and advantages of this invention will be readily apparent from the following description when considered in connection with the appended drawings.

Figure 1:
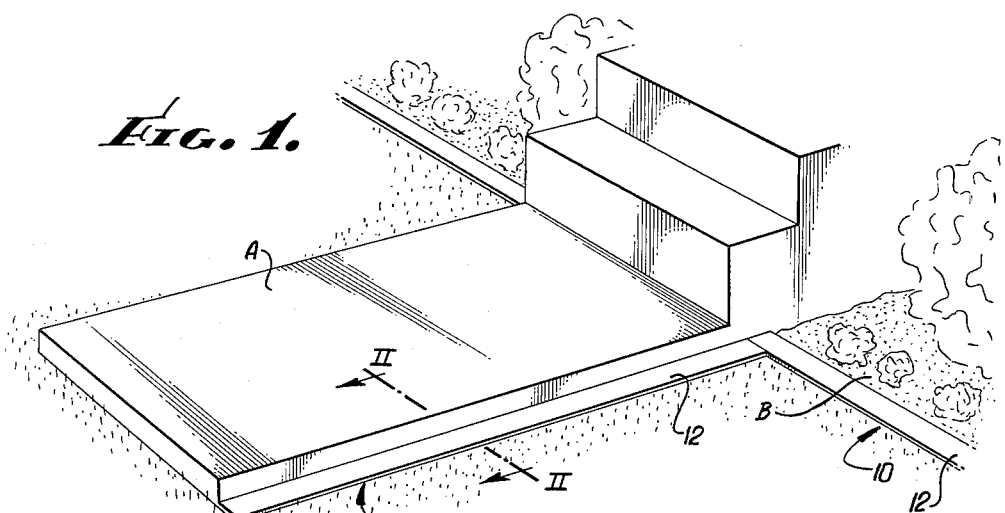
FIG. 1 is a perspective view showing how an exemplary device of the present invention may be used to form an edge or border around a lawn.

It is understood that the device of the present invention may be used around the edges of a lawn or wherever it is difficult to satisfactorily cut the grass which is adjacent to sidewalks, trees, buildings, gardens, shrubbery or the like. As shown in FIG. 1, an exemplary device 10 of the present invention is shown installed on a lawn adjacent to a sidewalk A and flower bed B.

The lawn edging device 10 is adapted to be inserted into the ground of a lawn or the like and includes essentially an elongated vertical ground-engaging member 11, an elongated horizontal edging member 12 extending substantially the same length as said vertical member, and means 13 for hinging the horizontal edging member 12 on the upper portion of the vertical member 11 without other portions of the device extending thereabove. While various hinging means may be provided, it has been found that a continuous piano-type hinge is better suited for this device. Well known means such as rivets, welding, screws or the like may be utilized for rigidly securing the hinge 13 to the members 11 and 12.

Figure 2:
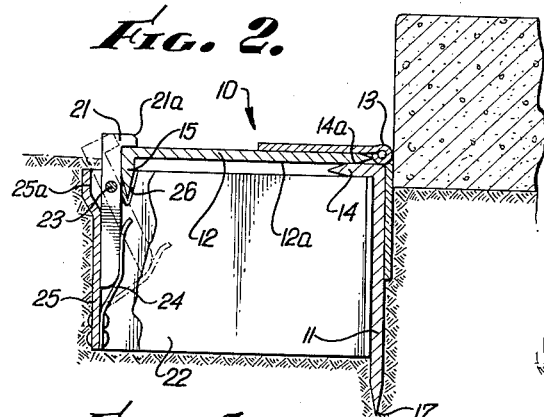
FIG. 2 is a transverse section of the device taken along plane II—II of FIG. 1 with a latch being added to provide a modification of the device.
Figure 4:
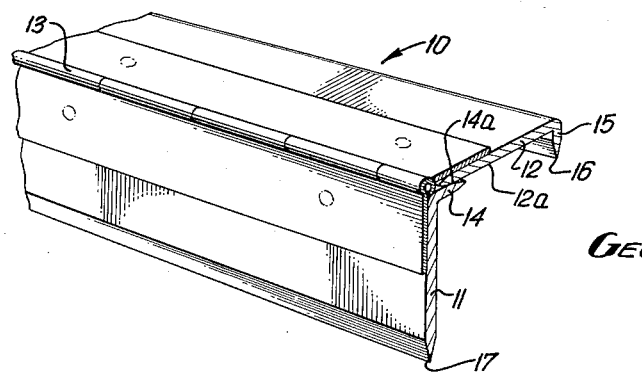
FIG. 4 is a fragmentary, enlarged perspective view of the exemplary device disclosed in FIGS. 1 to 3.

When the device 10 is installed in the ground of a lawn, it is not desirable to have underlying grass beneath the horizontal edging member 12 grow or extend between the members 11 and 12. Therefore, an elongated, inwardly extending flange 14 may be rigidly secured to one of the members and may extend along and engage the inner surface of the other member when the members are in vertical and horizontal relationship as shown in FIGS. 2 and 4. This inwardly extending flange 14 forms a seal to prevent grass or the like from extending between the members 11 and 12, such grass would then be required to be trimmed by hand or machine.

In order to anchor or maintain the horizontal edging member 12 in a semi-permanent horizontal position, means are provided for anchoring or securing this member to the ground of the lawn. Such means may include a downwardly extending anchoring flange 15 which is normal to and rigidly secured on the free edge of the horizontal member 12. The anchoring flange 15 may be provided with a sharp, pointed edge 16 for easily penetrating the ground. The lower end 17 of the vertical member 11 may also be provided with a pointed edge for the same purpose.

A primary advantage of the device of the present invention is the simple and inexpensive method from which this device can be made. The members 11 and 12 may be formed from various materials such as galvanized sheet metal, plastic, impregnated fiberglass, synthetic rubbers such as neoprene or Teflon, or even ceramic materials. Some of these materials are capable of being extruded in extremely long lengths. In such instances, a single strip of material, L-shaped in section may be formed and cut into predetermined lengths in order to form both the vertical member 11 and the horizontal member 12. The vertical and horizontal members 11 and 12 are therefore L-shaped in section and are each provided with long and short legs. The short leg on the vertical member being designated as flange 14 and the short leg on the horizontal member being designated as anchoring flange 15.

When assembled, the inner surface 12a of the long leg of the horizontal, L-shaped member 12 may be hingedly connected by the hinge means 13 on the outer surface 14a of the short leg 14 of said vertical, L-shaped member 11. The short leg or anchoring flange 15 of the horizontal member 12 therefore extends downwardly. It is thus understood that each member 11 and 12 may be identical in shape and may be adapted to be provided or formed from a single, elongated L-shaped member which may be formed by extrusion.

When the device 10 of the present invention is installed, the vertical member 11 is inserted into the ground of the lawn and the horizontal edging member 12 rests on top of the grass adjacent to sidewalks, trees, buildings, gardens or shrubbery. The anchoring flange 15 is also firmly inserted into the ground for securely retaining the horizontal edging member 12 in position. In this position, the device 10 forms a decorative border or edge around the lawn. It is contemplated that the horizontal edging member 12 may be colored or provided with various designs in order to enhance its attractiveness.

Figure 3:
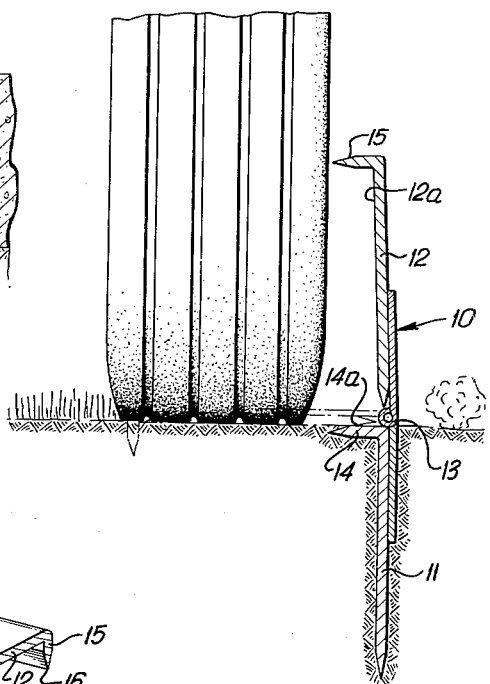
FIG. 3 is a transverse section of the device, similar to FIG. 2, but showing the horizontal edging member in the raised position during the cutting operation of the lawn.

When it is desired to cut the grass of the lawn, the horizontal edging member 12 is moved upwardly to allow the wheel of a lawn mower or cutting device to travel over the underlying grass as best seen in FIG. 3. It is understood that all of the underlying grass, adapted to be covered by the horizontal member 12, will not be satisfactorily cut. There will still remain some uncut grass which is adapted to be beneath the wheel of the lawn mower. However, all of the grass adjacent to the anchoring flange 15 will be cut by the lawn mower. After the grass has been cut, the horizontal member 12 is moved downwardly and re-positioned to form a border or edge for the lawn. Any uncut grass will therefore be concealed beneath this horizontal member 12.

It is thus seen that there is no need for any trimming either by hand or trimming machines, after a lawn has been cut when the device of the present invention is used as a border or edge for the lawn. The wheel of a lawn mower is adapted to travel over the grass underlying the horizontal member 12. After the grass has been cut, the horizontal member 12 is adapted to be re-positioned to cover and lie in substantially the same plane as the grass over which the wheel of the cutting device or lawn mower traveled.

It should also be noted, that a lawn mower or cutting device may pass directly over the device of the present invention when installed on a lawn without damaging the lawn mower. This is accomplished by not having any portions of the device extending substantially above the horizontal flat, planar, edging member 12 as shown in FIG. 2. In similar type devices used heretofore, vertical partitions or members extended above the horizontal edging member and would damage the cutting elements of a lawn mower when passing directly over the device.

Under certain circumstances, it may be desirable to provide latch means adapted to be positioned in the ground of the lawn for releasably latching the horizontal member 12 in a horizontal position on the lawn, as best seen in FIG. 2. An exemplary latch means is indicated at 21 and may be carried by the vertical member 11 and extend below the horizontal member 12 and outwardly beyond the anchoring flange 15 on said horizontal member. A horizontally extending supporting arm 22 is adapted to have one end rigidly fastened to the vertical member 11 by any suitable means such as welding, riveting, screws or the like. The latch member 21 is adapted to be pivotally connected on the other end of the supporting arm 22 by means of a pin 23 carried by the supporting arm. The latch member 21 is spring-biased towards a closed position, as shown in FIG. 2, by means of any suitable spring means such as a leaf spring 24 carried on a cross-supporting member 25 which may be rigidly secured to the outward end of the supporting arm 22 in a plane normal thereto. The upper end 25a of the cross-supporting member 25 protrudes outwardly to provide a space for the upper end of the latch member 21 when moved into its unlatched position, as seen by the phantom lines in FIG. 2. The upper end of the latch member 21 extends slightly above the horizontal member 12 in its horizontal position and is adapted to grasp the upper edge thereof. The horizontal supporting arm 22 is provided with a cut-out portion 26 for receiving the anchoring flange 15 in the horizontal position.

To unlatch the horizontal member 12 and allow the grass to be cut, the latching member 21 need only be moved outwardly away from the edging device 10. Spring 24 automatically returns the latching member to its latching position. It should be noted that the upper end of the latching member 21 is provided with a beveled edge 21a which cooperates with the pointed edge 16 of the anchoring flange 15 for forcing the latching member 21 outwardly into the position shown by the phantom lines in FIG. 2. Therefore, it is not necessary to manually move the latching member 21 when the horizontal member is moved from the vertical to the horizontal latching position.

Obviously, many modifications and variations of the present invention are possible in the light of the above teachings. It is therefore to be understood that within the scope of the appended claims, the invention may be practiced otherwise than as specifically described.

I claim:

A lawn edging device adapted to be inserted into the ground of a lawn or the like, comprising: an elongated, vertical ground-engaging member, an elongated, horizontal edging member extending substantially the same length as said vertical member and means for hinging said horizontal edging member on the upper portion of said vertical member without other portions of said device extending thereabove, whereby said edging member is adapted to be moved upwardly to allow the wheel of a cutting device to travel over the underlying grass and is adapted to be re-positioned to cover the grass over which the wheel of the cutting device traveled, said vertical and horizontal members being L-shaped in section and each member having long and short legs, the inner surface of said long leg of said horizontal L-shaped member being hingedly connected by said means on the outer surface of said short leg of said vertical L-shaped member, said short leg of said horizontal member extending downwardly and being used as an anchoring flange for said horizontal member, whereby each member is identical in shape and is adapted to be provided from a single L-shaped member.

References Cited in the file of this patent

UNITED STATES PATENTS

| | | |
|---|---|---|
| 2,713,751 | Hendrixson | July 26, 1955 |
| 2,821,809 | Collier et al. | Feb. 4, 1958 |